Jan. 9, 1923. 1,441,881
J. O. POTTER ET AL.
SEWING MACHINE.
FILED FEB. 7, 1920.
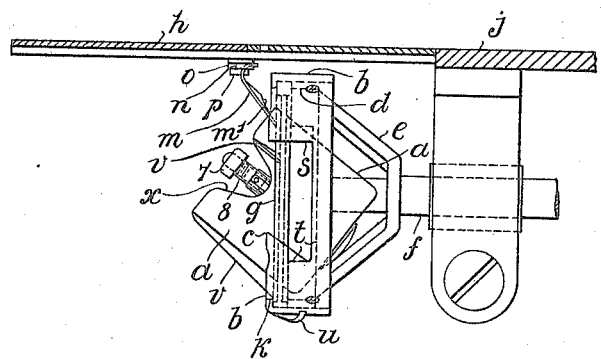
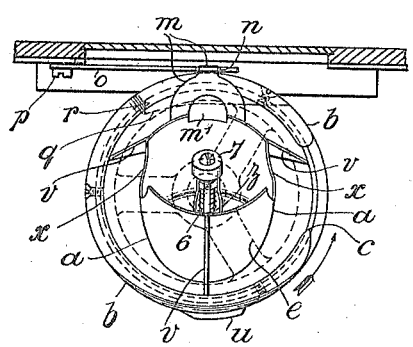
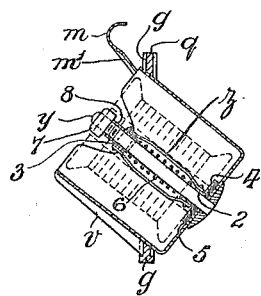
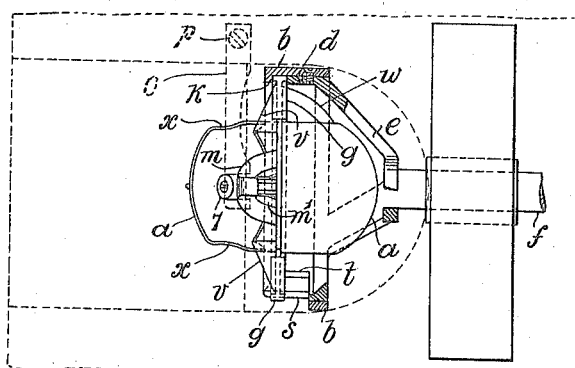
Inventors:
John O. Potter
Joseph Cooper
By
Rosenbaum Stockridge Bust
Attorneys Patented Jan. 9, 1923.

1,441,881

UNITED STATES PATENT OFFICE.

JOHN OAKDEN POTTER AND JOSEPH COOPER, OF ASHTON-UNDER-LYNE, ENGLAND, ASSIGNORS TO THE TWIN BOBBIN SEWING MACHINE COMPANY, LIMITED, OF ASHTON-UNDER-LYNE, ENGLAND.

SEWING MACHINE.

Application filed February 7, 1920. Serial No. 357,077.

*To all whom it may concern:*

Be it known that we, JOHN OAKDEN POTTER and JOSEPH COOPER, subjects of the King of Great Britain and Ireland, and residents of Ashton-under-Lyne, in the county of Lancaster, England, have invented certain new and useful Improvements in or Relating to Sewing Machines, of which the following is a specification.

This invention relates to lock-stitch sewing machines of the kind in which a continuously driven rotary hook takes up the loop in the needle-thread and passes same round the under-thread, and it has particular reference to machines of the said kind in which a reel, bobbin, cheese or the like (hereinafter referred to as a reel) of thread is used for the under-thread in the form in which it comes from the manufacturer. The invention is, however, also applicable to machines of the said kind in which the under-thread is re-wound on a spool or the like.

The invention has for its main object to provide an improved arrangement of reel, spool or like casing or carrier for containing or carrying the reel, spool or the like of under-thread, which will enable the ready insertion and removal of said reel, spool or the like from above, and will also materially reduce the tension on the needle-thread during the formation of the loop and the passage thereof over the under-thread. A further object of the invention is to provide improved means of tensioning the under-thread.

According to the invention, the rotary hook is mounted to rotate around the reel, spool or like casing or carrier (hereinafter referred to as the reel casing) which contains or carries the reel, spool or the like of under-thread, and the reel casing is mounted so as not to rotate, and so that its axis is oblique to the axis of the rotary hook and its front end, through which the reel, spool or the like is inserted and removed, has an upward tilt. The reel, spool or the like of under-thread is mounted on a peg in the reel casing and for tensioning the thread we rotatably mount on the peg a gripping device to receive and secure the reel, spool or the like, and comprising a flanged sleeve adapted to have its flange adjustably pressed against the end of the reel casing or against a friction washer or the like fitted between the flange and the end of the reel casing. The gripping device may also comprise bow springs adapted to receive the reel, spool or the like and connected to said flanged sleeve and an outer sleeve. The flange of the former sleeve may be pressed against the reel casing or against the friction washer by means of a spiral spring mounted on the peg between the flange and a loose sleeve on the outer end of the peg and the tension of the spring may be adjusted by a nut screwing on the peg and bearing against the loose sleeve.

The invention is hereinafter more fully described with reference to the accompanying drawing, in which Fig. 1 is a side view, Fig. 2 a front view, and Fig. 3 a sectional plan illustrating one form of stationary reel casing and tensioning means in accordance therewith, and Fig. 4 is a section of the reel casing and its carrying disc removed.

Referring to the drawing, *a* is a stationary reel casing for the under-thread, and *b* is a rotary hook ring formed with a hook *c* and adapted to rotate around the casing *a*. The hook ring *b* is mounted on the annular flange *d* of a spider *e* fixed on the driving shaft *f*. The reel casing *a* is fixed at an angle in a disc *g* so that its axis is oblique to the axis of the hook ring *b* and its front or open end has an upward tilt towards the sliding cover plate *h* closing the opening in the base *j* through which the reel, spool or the like of under-thread is inserted into and removed from the casing. The disc *g* is mounted in a recess formed between a lip *k* on the hook ring *b*, and the flange *d* of the spider *e*, and the disc and reel casing are prevented from rotating by a tongue *m* on the latter engaging in a notch *n* in a member *o* secured at *p* to the underside of the base *j*. Any other appropriate means of anchoring the disc *g* and reel casing *a* may be employed.

The disc *g* is cut away at *q* to form a projection *r* and the hook ring *b* and spider flange *d* are cut away at *s* and *t*, respectively. The hook ring *b* is also provided with an inclined or oblique projection *u*.

In operation, the hook *c* engages the loop of the needle thread and passes same round the reel casing *a* and over the under-thread contained therein. On engagement with the loop, the hook carries same forward and one part or side of the loop engages the projection $r$ on the disc $g$ and is passed through the gaps $s$, $t$ to and over the rear of the reel casing $a$, the other part or side of the loop being thrown on to the front of the reel casing by the projection $u$ and passed thereover. On the loop being carried over the under-thread and disengaged from the hook $c$, it is pulled up by the take-up motion in the usual way, the loop passing over the tongue $m$ which is an easy fit in the notch $n$ for the purpose, and is formed with an opening $m^1$ to clear the needle when same descends.

In order to facilitate the passage of the loop round the reel casing $a$, and to reduce the surface on which the loop bears and minimize the tension on the thread forming the loop, narrow ribs are provided extending from the reel casing to near the periphery of its carrying disc $g$. Conveniently, and as illustrated, three such ribs $v$ are provided at the front side of the disc and only a single rib $w$ at the rear side.

The wall of the reel casing $a$ is cut away at $x$ to provide finger spaces for the grasping of the reel, spool or the like of under-thread during the insertion and removal thereof.

The reel, spool or the like of under-thread, shown in dotted lines in Fig. 4, is mounted on a peg $y$ in the reel casing $a$ and for tensioning the thread there is mounted on the peg a gripping device comprising bow springs $z$ to receive and secure the reel, spool or the like, and inner and outer sleeves 2, 3 to which the ends of the springs $z$ are attached. The inner sleeve 2 is formed with a flange 4 adapted to be adjustably pressed against the end of the casing $a$, or against a friction washer 5 interposed between the flange and the end of the casing, by spiral spring 6 surrounding the peg $y$ and a nut 7 screwing on the peg and bearing against a loose sleeve 8 which in turn bears against the outer end of the spiral spring 6. By adjusting the nut, the strength of the spiral spring 6 and hence the tension of the under-thread may be adjusted.

It will be obvious that the inclined arrangement of the non-rotating reel casing $a$ combined with the centre tensioning of the under-thread has the great advantage of dispensing with any threading of the under-thread, it being sufficient to simply place the reel, spool or the like on the peg and commence sewing, and also greatly facilitates the insertion and removal of the reel, spool or the like of under-thead from above, and the adjustment of the tension of the thread.

What we claim as our invention, and desire to secure by Letters Patent is:—

1. In a lock-stitch sewing machine, a hook ring mounted for rotation in a plane parallel with the needle, a disc mounted in said ring and held against rotation therewith, a reel casing having a spool supporting pivot therein carried by the disc with the pivot extending in a vertical plane upwardly and obliquely with respect to the plane of rotation of the hook ring, a spool of thread rotatably carried by the pivot within the reel casing, a tongue extending upwardly from the casing, a stationary support having a notch opening toward the needle into which the tongue loosely extends whereby as the loop in the needle thread is carried around the underthread and pulled up, the loop will pass over the tongue and through the slot.

2. In a lock-stitch sewing machine, a hook ring mounted for rotation in a plane parallel with the needle, a disc mounted in said ring and held against rotation therewith, a reel casing having a spool supporting pivot therein carried by the disc with the pivot extending in a vertical plane upwardly and obliquely with respect to the plane of rotation of the hook ring, a spool of thread rotatably carried by the pivot within the reel casing, a tongue extending upwardly from the casing, a stationary support having a notch opening toward the needle into which the tongue loosely extends whereby as the loop in the needle thread is carried around the underthread and pulled up, the loop will pass over the tongue and through the slot, said tongue having an aperture therein for the passage of the needle.

3. In a lock-stitch sewing machine having a needle passing vertically through a work supporting surface, a shaft disposed below the said surface and extending at right angles to the direction of movement of the work beneath the needle, said shaft being rotated in timed relation relatively to the movements of the needle, a hook ring carried by the end of the shaft and in operative relation to the needle, a disc carried by the ring and held against rotation therewith and in a plane perpendicular to the shaft, a cup-shaped casing carried by the disc with its axis in the vertical plane of the shaft and extending upwardly and obliquely away from the shaft, a spool of thread rotatably mounted within the casing about the axis of the latter, and means for preventing rotation of the casing and disc but permitting passage of the thread loop.

4. In a lock-stitch sewing machine having a needle passing vertically through a work supporting surface, a shaft disposed below the said surface and extending at right angles to the direction of movement of the work beneath the needle, said shaft being rotated in timed relation relatively to the movements of the needle, a hook ring carried by the end of the shaft and in operative relation to the needle, a disc carried by the ring and held against rotation therewith and in a plane perpendicular to the shaft, a cup-shaped casing carried by the disc with its axis in the vertical plane of the shaft and extending upwardly and obliquely away from the shaft, a spool of thread rotatably mounted within the casing about the axis of the latter, a tongue extending upwardly from the casing, and a stationary support having a notch therein into which the tongue loosely extends whereby as the loop in the needle thread is carried around the underthread and pulled up the loop will pass between the tongue and the slot.

5. In a lock-stitch sewing machine having a needle passing vertically through a work supporting surface, a shaft disposed below the said surface and extending at right angles to the direction of movement of the work beneath the needle, said shaft being rotated in timed relation relatively to the movements of the needle, a hook ring carried by the end of the shaft and in operative relation to the needle, a disc carried by the ring and held against rotation therewith and in a plane perpendicular to the shaft, a cup-shaped casing carried by the disc with its axis in the vertical plane of the shaft and extending upwardly and obliquely away from the shaft, a spool of thread rotatably mounted within the casing about the axis of the latter, a tongue extending upwardly from the casing, and a stationary support having a notch therein into which the tongue loosely extends whereby as the loop in the needle thread is carried around the underthread and pulled up the loop will pass between the tongue and slot, said tongue having an aperture therein for the passage of the needle.

6. In a lock stitch sewing machine, a hook ring mounted for rotation in a plane parallel with the needle, a disc mounted in said ring and held against rotation therewith, a reel casing having a spool supporting pivot therein carried by the disc with the pivot extending in a vertical plane upwardly and obliquely with respect to the plane of rotation of the hook ring, a spool of thread rotatably carried by the pivot within the reel casing, and means for retaining the casing against rotation but permitting passage of the thread loop around the casing.

7. In a lock-stitch sewing machine, the combination with the reel casing having an axial pivot therein, of a gripping device rotatably mounted on said peg in the casing to receive and secure the reel of underthread, a flange on said device, and means adjustably carried by the peg for varying the friction between the flange and the casing.

8. In a lock-stitch sewing machine having a rotatable hook ring and a relatively stationary disc, a reel casing carried by the disc, a pivot pin in said casing and extending axially thereof from the bottom wall, a resilient arbor for receiving and mounting a spool rotatably upon said pin and having a flange abutting the bottom wall of the casing, a spring for forcing the arbor and flange against the bottom wall, and means adjustable on the pin for varying the stress of the spring.

9. In a lock-stitch sewing machine having a rotatable hook ring and a relatively stationary disc, a reel casing carried by the disc, a pivot pin in said casing and extending axially thereof from the bottom wall, a flanged sleeve rotatably mounted on said pin, bow springs extending therefrom lengthwise of the pin, a sleeve to which the other ends of the springs are connected, a sleeve slidable on said pin and upon which the second mentioned sleeve is slidable, a thread spool carried by the bow springs, a spring compressed between the third mentioned sleeve and the flanged sleeve for forcing the latter against the bottom of the casing to resist rotation of the spool and sleeves, and means adjustable on said pin for shifting the third mentioned sleeve to vary the compression of the spring.

In witness whereof we have hereunto set our hands.

JOHN OAKDEN POTTER.
JOSEPH COOPER.